June 23, 1959

R. RABE 2,891,641

CENTRIFUGALLY ACTUATED FRICTION DRIVE DEVICE

Filed April 2, 1956

INVENTOR.
RUDOLPH RABE
BY
Barnes, Kisselle, Laughlin & Raisch
ATTORNEYS.

June 23, 1959 R. RABE 2,891,641
CENTRIFUGALLY ACTUATED FRICTION DRIVE DEVICE
Filed April 2, 1956 2 Sheets-Sheet 2
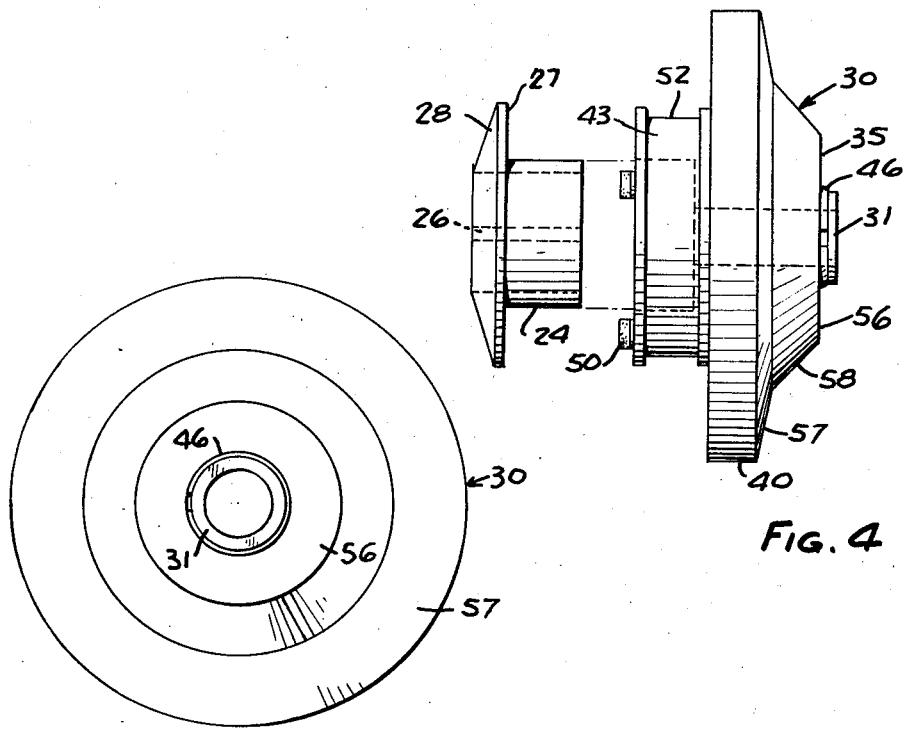
FIG. 4
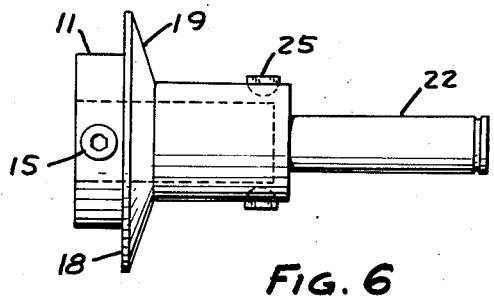
FIG. 5
FIG. 6
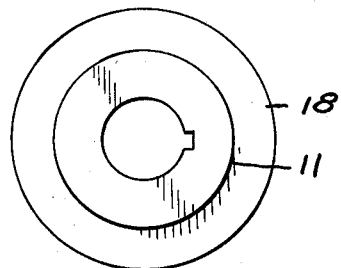
FIG. 7
INVENTOR.
RUDOLPH RABE
BY
Barnes, Kisselle, Laughlin & Raisch
ATTORNEYS.

2,891,641
CENTRIFUGALLY ACTUATED FRICTION DRIVE DEVICE

Rudolf Rabe, Taylor Center, Mich.

Application April 2, 1956, Serial No. 575,636

8 Claims. (Cl. 192—4)

This invention relates generally to a centrifugally operated friction drive device and more particularly to a device in which there is a lag between acceleration of a drive shaft to running speed and actuation of the centrifugal operating mechanism.

The invention is applicable generally to all types of motorized apparatus where such a drive device is desirable. An exemplary application of the invention is in relatively small powered equipment such as lawn mowers, garden tillers, and the like. In such equipment it is often desirable to have a driving connector which will remain disengaged at low engine speeds but will engage when the engine is accelerated to running speed. A device of this type is disclosed in my copending application Serial No. 532,456, filed September 6, 1955.

An object of this invention is to provide an inexpensive structure of this general type having improved, more compact construction and having improved operating characteristics.

The invention generally contemplates a self-contained centrifugally operable actuating assembly which can be adapted for use with various types of friction drive devices. The assembly includes both the centrifugal medium for expanding the assembly and spring means for collapsing the assembly and is adapted for engagement by a brake shoe for controlling operation of the assembly. One form of the invention is shown in the accompanying drawings.

Fig. 4 is a side elevational view of the actuating assembly with a driving pulley member shown in exploded relation thereto.

Fig. 5 is an end elevational view of the actuating assembly.

Fig. 6 is an elevational view of the central shaft of the device and one of the pulley members separate from the other parts.

Fig. 7 is an end view taken from the left of Fig. 6.

Figure 1:
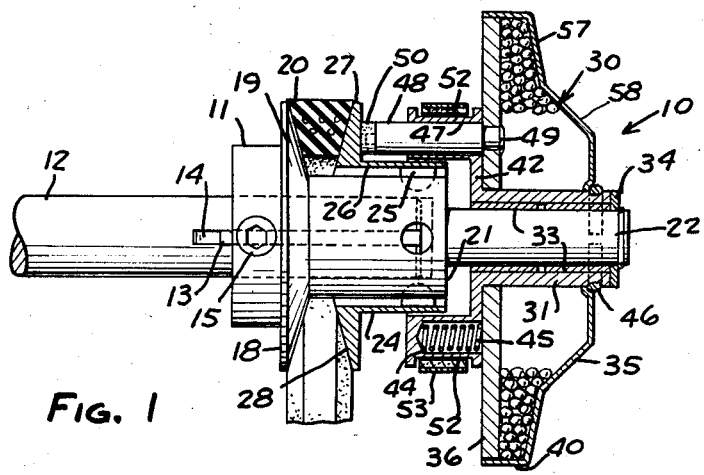
Fig. 1 is a sectional view of a clutch structure embodying this invention.

The device 10 shown in the drawings includes a shaft 11 which is illustrated as being hollow so that it can be fixed non-rotatably about the drive shaft 12 of an engine, not shown, by such means as a key 13 secured in an axial key-way 14 by a set screw 15. Shaft 11 has a radial pulley element 18 thereon formed at its inner side 19 to engage a side of a V belt 20. Shaft 11 has a radial shoulder 21 and continues in a shaft portion 22 of smaller diameter.

A sleeve 24 is non-rotatably but freely slidably secured on shaft 11 by interengaging keys 25 and key-ways 26. Sleeve 24 has a radial pulley member 27 thereon formed at its inner face 28 to engage a side of V belt 20. Pulley members 18 and 27 frictionally drivingly engage belt 20 and release the belt upon shifting pulley member 27 toward and away from pulley member 18.

The centrifugal actuating unit 30 includes a central hollow shaft 31 arranged to be mounted around shaft extension 22 in a rotatable, frictional drag connection as through sleeve bearings 33 which are preferably oilite type bearings and which are secured axially on shaft extension 22 by a washer 34 fixed in place by a snap ring as shown. Extending generally radially outwardly from sleeve 31 are two plates 35 and 36 which cooperate to define a chamber 37 for centrifugal medium 38 which has the property of flowing radially outwardly of sleeve 31 under the action of centrifugal force when actuator 30 is rotated and which has the property of being movable axially inwardly when the centrifugal force diminishes upon deceleration of the actuator. In the form shown, the hydraulic medium comprises a body of shot. Plate 36 is generally flat and fits slidably within an axial skirt 40 on plate 35. Plate 36 has a central aperture which fits slidably around sleeve 31.

Figure 2:
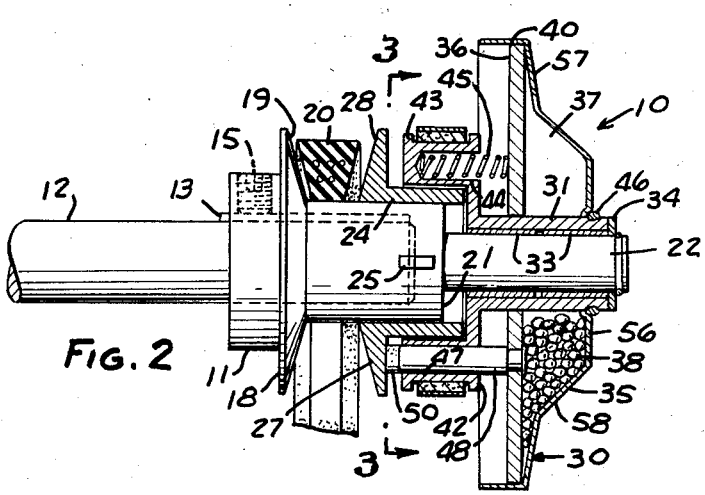
Fig. 2 is a sectional view of the structure on a plane different from Fig. 1 and showing the structure in a different position.
Figure 3:
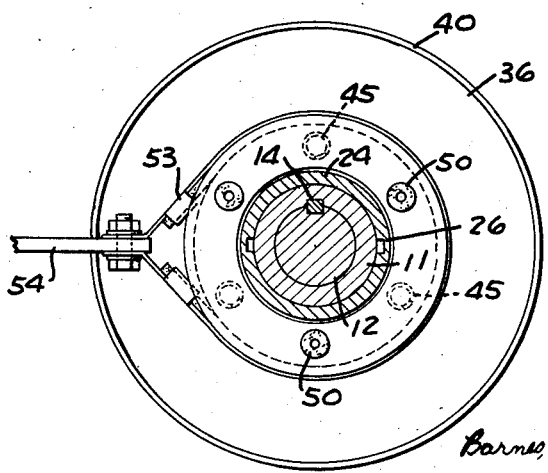
Fig. 3 is a sectional view on line 3—3 of Fig. 2.

Sleeve 31 has a radially extending flange portion 42 with an axially extending skirt 43 recessed as at 44 to provide seats for compressed coil springs 45 which urge plate 36 toward the right as the drawings are viewed and tend to hold chamber 37 in the collapsed condition illustrated in Fig. 2. Housing element 35 is secured axially on sleeve 31 against the action of springs 45 by such means as a snap ring 46, and plates 35 and 36 are frictionally secured against rotation relatively to sleeve 31.

Flange 42 has axial openings 47 through which a plurality of pins 48 slidably extend. One end 49 of each pin is anchored on plate 36 and the other end of each pin preferably has an oilite tip 50 for bearing against pulley element 27. The radially outer periphery of skirt 43 is preferably formed to provide a brake drum 52 for engagement by a brake shoe or band 53 which may be operated by a direct pull bar 54. Housing plate 35 has generally the form of a truncated cone with its apex portion 56 extending radially of sleeve 31, its base portion 57 being flared outwardly to extend at an acute angle relatively to plate 36 and with its intermediate portion 58 being angled to the base and to apex 56.

In use it may be assumed that structure 10 has been assembled in the manner described and secured to the drive shaft 12 of an engine. Shaft 11, pulley elements 18 and 27 and shaft extension 22 rotate with shaft 12. Assuming that brake band 53 is released and that the engine is idling, the frictional drag between shaft extension 22 and sleeve 31 rotates sleeve 31 and housing 37 at a speed insufficient for shifting shot 38 centrifugally outwardly. Consequently at idling speeds springs 45 hold plate 36 to the right as the drawings are viewed, and pulley element 27 remains in the disengaged position illustrated in Fig. 2.

When shaft 12 is accelerated to running speed, the frictional drag between shaft extension 22 and sleeve 31 is increased. Housing members 35 and 36 are rotated rapidly so that the mass of shot 38 is thrown centrifugally outwardly. The shot act upon the relatively angled surfaces of the plates and extend chamber 37 axially, forcing plate 36 and pins 48 thereon to the left against the action of springs 45. The oilite tips 50 on the pins engage pulley element 27 and move it to the left so that surfaces 19 and 28 are closed into frictional driving engagement against belt 20.

The speed of rotation of shaft 12 may be reduced from time to time when the engine driving it is idled down, for example, when a lawn mower or similar device driven by the engine is momentarily stopped. When this occurs, the frictional drag between shaft extension 22 and sleeve 31 diminishes, removing the driving connection therebetween. The force of shot 38 on plates 35 and 36 is relieved and plate 36 moves to the left under the action of springs 45 freeing pulley member 27 for movement away from pulley member 18 to disengage surfaces 19 and 28 from belt 20. Surfaces 19 and 28 re-engage belt 20 in the manner described when shaft 12 is again accelerated.

Pulley members 18 and 27 may be disengaged from belt 20 regardless of the speed of rotation of shaft 12 by pulling on rod 54 to frictionally engage brake shoe 53 against brake drum 52. This slows rotation of plates 35 and 36 sufficiently to reduce the centrifugal force of shot 38 so that the pulley members will disengage the belt in the manner described. A relatively small amount of braking force is required to overcome the frictional driving connection between shaft extension 22 and sleeve 31. The driving connection may thus be released by a relatively easy direct manual pull on rod 54. To re-establish the driving connection, rod 54 is merely released to relieve the braking pressure on drum 52 so that plates 35 and 36 may resume rotation.

The acute angle between plate 36 and the base portion 57 of plate 35 provides a relatively great initial mechanical advantage for shot 38 in shifting plate 36 centrifugally against spring 45. The angled intermediate portion 58 of plate 35 provides room for an adequate body of shot 38.

Actuating unit 30 is an independent unit which can be rapidly and simply assembled with other components in manufacture and which can be adapted for use in actuating various kinds of clutches as well as the specific pulley type drive device illustrated in the drawings.

I claim:

1. A centrifugally operated friction drive device comprising, shaft means adapted to be rotated by motor means, a sleeve mounted around a portion of said shaft means in a rotatable frictional drag connection, a first element fixed on said sleeve, a second element axially movable upon said sleeve, said elements cooperating to form a holder for centrifugal medium, said frictional drag connection being operative to rotate said holder when said portion of said shaft means attains generally a predetermined speed of rotation, said medium being operable responsively to rotation of said holder at generally a predetermined speed to move said second element axially, projecting means on said sleeve forming a stop for limiting axial movement of said second element, means operative to return said second element when the rotation of said holder falls below said predetermined speed thereof, disengageable friction drive means, said second element being operable upon movement in one direction to effect engagement of said friction drive means, and being operable to release said friction means upon movement in another direction.

2. A centrifugally operated friction drive device comprising, shaft means adapted to be connected to motor means for rotation, a first friction drive member fixed on said shaft means, a second friction drive member movable on said shaft means to effect engagement and releasing of a friction drive connection, a sleeve mounted around a portion of said shaft means in a rotatable frictional drag connection, a first element fixed on said sleeve, a second element axially movably mounted on said sleeve, said elements cooperating to form a holder for centrifugal medium, said frictional drag connection being operative to rotate said holder when said portion of said shaft means attains generally a predetermined speed of rotation, said medium being operable responsively to rotation of said holder at generally a predetermined speed to move said second element axially on said sleeve, projecting means on said sleeve forming a stop for limiting the axial movement of said second element, spring means operable to return said second element when the rotation of said holder falls below said predetermined speed thereof, said second element being operative upon movement in one direction to move said second friction drive member to establish the friction drive connection, said second element being operative upon movement in another direction to release said second friction drive member.

3. Centrifugal actuating means for a releasable driving connection comprising, a shaft, said shaft being adapted to be connected to motor means in a rotatable frictional drag connection, a first element fixed on said shaft, a second element axially movably mounted on said shaft, said elements cooperating to form a holder for centrifugal medium, said medium being operable responsively to rotation of said holder at generally a predetermined speed to move said second element axially, projecting means on said shaft forming a stop for limiting axial movement of said second element, means operative to return said second element when the rotation of said holder falls below said predetermined speed thereof, said second element being adapted upon movement thereof in one direction to effect engagement of a releasable driving connection with which said actuating means is adapted to be used, said second element being adapted to release the driving connection upon movement of said second element in the other direction.

4. Centrifugal actuating means for a releasable driving connection comprising, a shaft, said shaft being adapted to be connected to motor means in a rotatable frictional drag connection, a first element fixed on said shaft, a second element axially movably mounted on said shaft, said elements cooperating to form a holder for centrifugal medium, said medium being operable responsively to rotation of said holder at generally a predetermined speed to move said second element axially, said sleeve having a generally radial flange forming a stop for limiting axial movement of said second element, a spring seating on said flange and reacting against said second element to return said second element when the rotation of said holder falls below said predetermined speed thereof, a plurality of pins on said second element, said pins being slidably supported by said flange, said pins being operative upon movement of said second element in one direction to effect engagement of a releasable driving connection with which said actuating means is adapted to be used, said pins being adapted to release the connection upon movement of said second element in the other direction.

5. Centrifugal actuating means for a releasable driving connection comprising, a shaft, said shaft being adapted to be connected to motor means in a rotatable frictional drag connection, a first element fixed on said shaft, a second element axially movably mounted on said shaft, said element cooperating to form a holder for centrifugal medium, said medium being operable responsively to rotation of said holder at generally a predetermined speed to move said second element axially, said sleeve having a generally radial flange forming a stop for limiting axial movement of said second element, said flange including a generally axially extending skirt portion, a spring seating on said flange and reacting against said second element to return said second element when the rotation of said holder falls below said predetermined speed thereof, a plurality of pins on said second element, said pins being slidably supported by said skirt, said pins being operative upon movement of said second element in one direction to effect engagement of a releasable driving connection with which said actuating means is adapted to be used, said pins being adapted to release the driving connection upon movement of said second element in the other direction, the outer periphery of said skirt being adapted to be engaged by a brake shoe means to facilitate slowing the rotation of said holder independently of the speed of the driven shaft for releasing the driving connection.

6. Centrifugal actuating means for a releasable driving connection comprising, a shaft, said shaft being adapted to be connected to a driven shaft in a rotatable frictional drag connection, a first element fixed on said shaft, a second element axially movably mounted on said shaft, said elements cooperating to form a holder for centrifugal medium, said medium being operable responsively to rotation of said holder at generally a predetermined speed to move said second element axially, said shaft having a generally radial flange forming a stop for limiting axial movement of said second element, said flange including a generally axially extending portion, a plurality of recesses in said axially extending portion, spring means seating in said recesses and acting upon said second element to return the same when the rotation of said holder falls below said predetermined speed thereof, said axially extending portion having a plurality of axial openings therethrough, a plurality of pins fixed on said second element and extending slidably through said openings, said pins being operative upon movement of said second element in one direction to effect engagement of a releasable driving connection with which said actuating means is adapted to be used, said pins being adapted to release the driving connection upon movement of said second element in the other direction.

7. Centrifugal actuating means for a releasable driving connection comprising, a shaft, said shaft being adapted to be connected to motor means in a rotatable frictional drag connection, a first element fixed on said shaft, a second element axially movably mounted on said shaft, said elements cooperating to form a holder for centrifugal medium, said medium being operable responsively to rotation of said holder at generally a predetermined speed to move said second element axially, projecting means on said shaft forming a stop for limiting axial movement of said second element, means operative to return said second element when the rotation of said holder falls below said predetermined speed thereof, said second element being adapted upon movement thereof in one direction to effect engagement of a releasable driving connection with which said actuating means is adapted to be used, said second element being adapted to release the driving connection upon movement of said second element in the other direction, said second element having the form of a substantially flat plate extending generally radially of said shaft, said first element having the general form of a truncated cone, the base portion of said cone being flared outwardly at an acute angle to said flat plate whereby to provide relatively great initial mechanical advantage for the action of said centrifugal medium, the upper portion of said cone being angled to said base portion to increase the volume of centrifugal medium which can be held in said holder.

8. A centrifugally operated releasable drive device comprising, shaft means adapted to be rotated by motor means, a first friction drive member fixed on said shaft means, a second friction drive member, said members being adapted to engage opposite sides of a V-type belt, said second member being axially movable on said shaft means for engaging and releasing the belt, a sleeve mounted around a portion of said shaft means in a rotatable frictional drag connection, a first element fixed on said sleeve, a second element axially movably mounted on said sleeve, said elements cooperating to form a holder for centrifugal medium, said frictional drag connection being operative to rotate said holder when said portion of said shaft means attains generally a predetermined speed of rotation, said sleeve having a generally radially projecting flange forming a stop for limiting the axial movement of said second element, said flange including a generally axially extending skirt portion, spring means on said flange operative to return said second element when the rotation of said holder falls below said predetermined speed, a plurality of axially extending pins on said second element, said pins projecting slidably through said flange, said pins engaging said second member upon movement of said second element in one direction for engaging said members drivingly against a V-type belt therebetween, said pins disengaging said second member upon movement of said second element in the other direction for releasing said members from driving engagement against the belt, the outer periphery of said skirt portion being adapted to be engaged by brake shoe means so that rotation of said holder can be slowed independently of the speed of rotation of said shaft means.

References Cited in the file of this patent

UNITED STATES PATENTS

| | | |
|---|---|---|
| 1,618,644 | Dickson | Feb. 22, 1927 |
| 2,290,513 | Wemp | July 21, 1942 |
| 2,553,505 | Miner | May 15, 1951 |